(12) United States Patent
Kusner

(10) Patent No.: US 6,564,849 B1
(45) Date of Patent: May 20, 2003

(54) HANDLE FOR A UTILITY TOOL

(75) Inventor: John D. Kusner, Hudson, OH (US)

(73) Assignee: Summit Tool Company, Akron, OH (US)

( * ) Notice: Subject to any disclaimer, the term of this patent is extended or adjusted under 35 U.S.C. 154(b) by 0 days.

(21) Appl. No.: 09/895,123

(22) Filed: Jul. 2, 2001

(51) Int. Cl.[7] .............................. B60C 25/04; B25D 1/00
(52) U.S. Cl. ........................ 157/1.3; 81/20; 30/308.1; 403/334
(58) Field of Search .................. 81/20, 22; 403/334; 157/1.3; 30/308.1

(56) References Cited

U.S. PATENT DOCUMENTS

| | | | | |
|---|---|---|---|---|
| 2,318,193 A | * | 5/1943 | Branham | 403/334 |
| 3,578,825 A | * | 5/1971 | Merrow | 81/20 |
| 4,181,166 A | * | 1/1980 | Jones | 30/308.1 |
| 4,287,640 A | * | 9/1981 | Keathley | 81/22 |
| 4,352,381 A | * | 10/1982 | Provi | 81/20 |
| 4,585,370 A | * | 4/1986 | Rose | 81/20 |

OTHER PUBLICATIONS

Ken–Tool Catalog, Catalog KT 0201, p. 11. (2001).

* cited by examiner

Primary Examiner—D. S. Meislin
(74) Attorney, Agent, or Firm—Renner Kenner Greive Bobak Taylor & Weber

(57) ABSTRACT

A handle for a tire bead breaking tool is disclosed, comprising an elongate shaft having a gripping portion, a shield portion, and a working portion at a forward end. The working portion is configured having an oblong cross-section comprising protruding opposite end surfaces and substantially less protruding opposite lateral surfaces disposed between the end surfaces. The lateral surfaces of the working portion extend along at least a portion of the gripping portion. The working portion of the handle is press fit into a circular bore of a tool head and contacts sidewalls defining the bore along the handle protruding end surfaces.

21 Claims, 4 Drawing Sheets

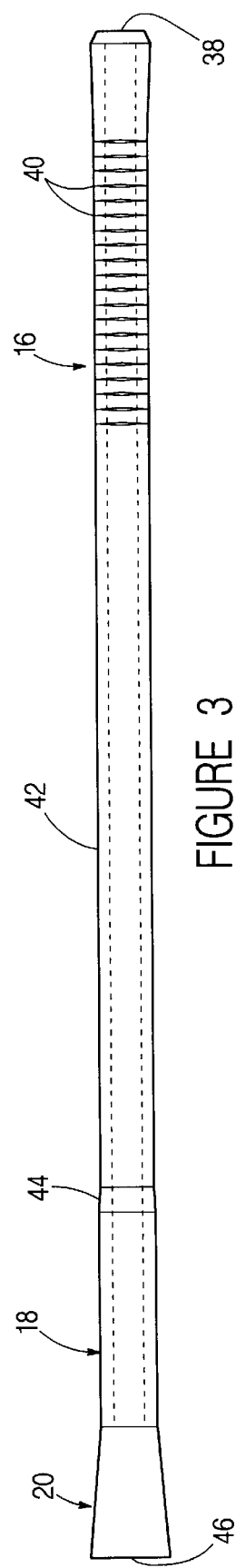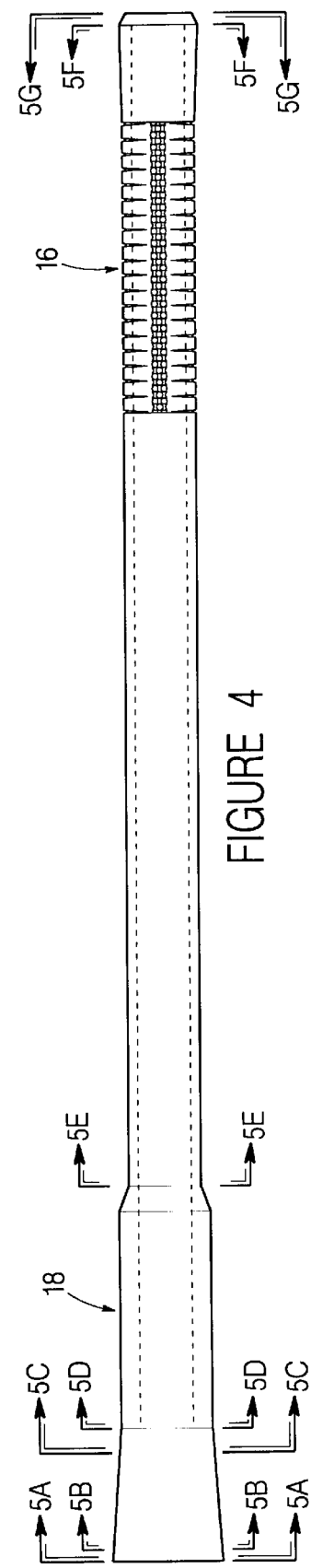

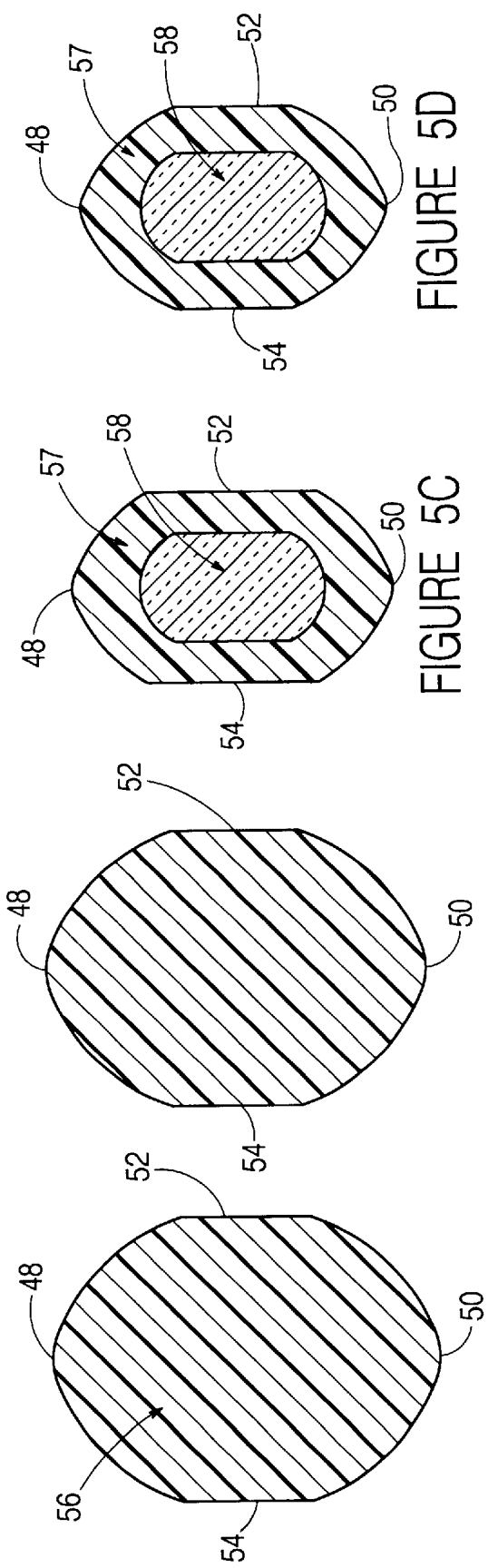
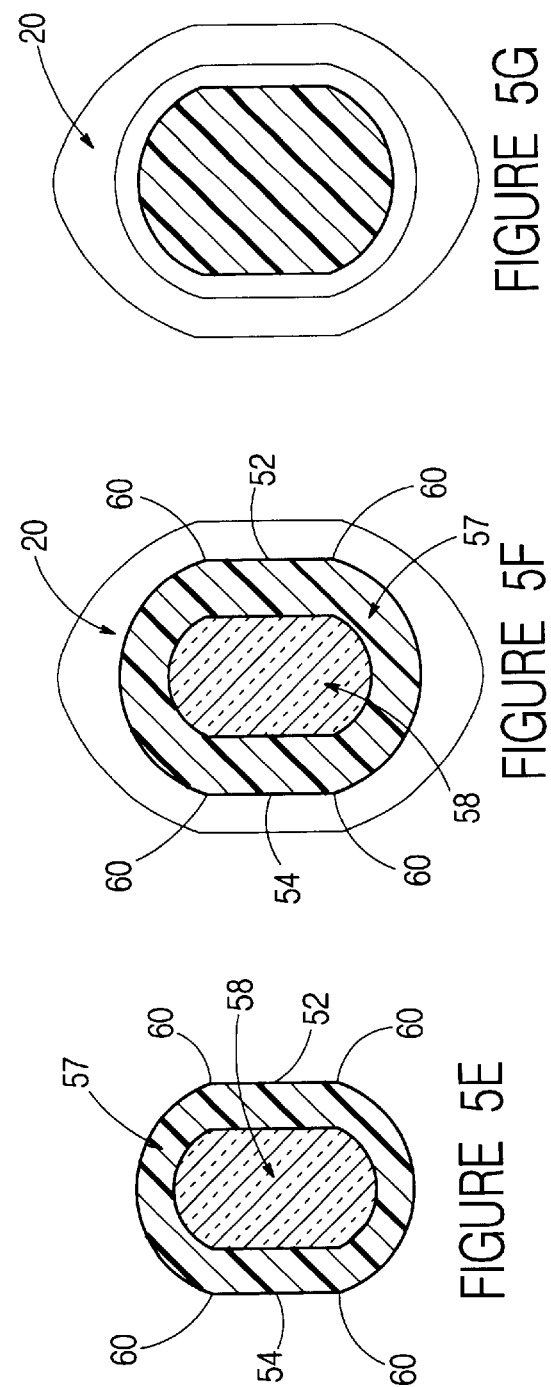

HANDLE FOR A UTILITY TOOL

TECHNICAL FIELD

The present invention relates generally to a handle for a utility tool and, more specifically, to a handle for a tire bead breaking wedge.

BACKGROUND ART

Tire bead breaking wedges are known in the art and are in commercial use. Such tools generally comprise an elongate handle affixed at one end to a wedge head. The wedge head comprises an elongate body, typically formed from cast metal, having a striking surface at one end and a wedge edge at an opposite end. A circular in cross-section through-bore extends through the tool head at a location representing the center of mass.

The handle for the subject type of tool is generally of elongate, cylindrical configuration extending from a gripping end to an inverted frustro-conical forward end. The handle may be of wood, metal, plastic, or a composite composition. The forward end of the handle may further be coated with a rubber or other high coefficient of friction material.

Assembly of the wedge head to the handle is achieved by inserting the handle gripping end downward through the head bore until the forward end of the handle enters the bore of the head. The dimension of the forward end of the frustro-conical handle portion is oversized relative to the head bore. Accordingly, driving the frustro-conical handle portion downward into the bore of the head wedges the forward portion of the handle into the bore and establishes a tight, frictional connection between the handle and wedge head.

In use, the user positions the working edge of the tool between a wheel rim and tire bead. Thereafter, a hammer is applied to the striking surface, serving to drive the wedge edge downward until the bead of the tire is disengaged from the wheel rim. Should the bead prove resistant, a user of the bead-breaking wedge will typically pry the wedge head back and forth until engagement between the bead and the wheel rim is broken.

A bead breaking wedge of the aforementioned type is commercially sold as a Model 35329 wedge and T11E head by Ken-Tool Company, of 768 E. North Street, Akron, Ohio 44305. While the implement works well and has met with considerable commercial success, it has been found that rocking the wedge back and forth against the tire bead can, over time, cause the handle forward end portion to work its way loose from the wedge head, requiring a re-tightening by the user. Still further, repeated rocking action of the wedge head relative to the handle may act to frictionally wear away the portions of the inverted frustro-conical handle end lying along the wedge head longitudinal axis until only the lateral sides of the forward handle end remain in frictional engagement with the wedge head. In this condition, the wedge head may become free to rock backward and forward about the lateral sides of the forward handle end, "play" that is undesirable to the intended purpose of the tool. Eventually, the head will become loose from the handle and a retightening will be required. However, once the handle forward portion becomes worn to a considerable degree, a re-tightening of the handle to the tool head in known tools becomes increasingly problematic.

In order to postpone, if not eliminate, loosening between the handle forward end and the wedge head, handle manufacturers have incorporated ribs along the inverted frustro-conical outer surface of the forward handle end. The ribs engage circular sidewalls defining the wedge head bore. As the tool is used, the ribs wear away at a slower pace and a positive frictional engagement between the head and the handle is prolonged. The ribs, however, are of narrow width dimension making the area of surface to surface contact between the handle end and the wedge head less than desired. In addition, though occurring at a slower pace, the ribs will eventually wear away. When the ribs are gone, the handle and wedge head will loosen in the manner described above. A repeated retightening of the wedge head connection with the handle will be increasingly required and over time, re-tightening, as explained above, becomes increasingly problematic.

A second deficiency in known handles for tire bead breaking wedges is that users commonly contact the wheel rim with a portion of the tool proximate the working end. Such contact can, in time, cause a structural failure of the handle at the point of impact. In addition, the handle gripping area in known tools is generally smooth and regular. Establishing and maintaining a tight grip with the tool handle can become increasingly difficult as the user becomes fatigued.

Accordingly, there is a need for a tire bead-breaking tool having a head to handle frictional connection that will not degrade from repeated use of the tool over time. Moreover, such a tool handle should provide the user with a positive gripping area and incorporate added strength to areas prone to damage from contact between the handle and a wheel rim.

SUMMARY OF THE INVENTION

It is, therefore, an object of the invention to provide a handle for a utility tool that establishes and maintains a positive frictional engagement with the tool head.

A further object is to provide a handle for a utility tool that provides a user with a comfortable gripping portion.

Yet a further object is to provide a handle for a utility tool that self-tightens the frictional connection between the handle and the tool head.

Another object of the invention is to provide a handle for a tire bead-breaking tool providing structural reinforcement to handle portions prone to contact with a wheel rim during use.

A further object of the invention is to provide a handle for a tire bead-breaking wedge that is comfortable to grip and wield and that provides a positive application of mechanical advantage through the tool head to the working wedge edge.

A further object is to provide a handle for a tire bead-breaking wedge that is economically and readily manufactured and readily connected to a tool head.

The aforementioned objectives, and others that will be apparent to one skilled in the art, are achieved by a tool handle described and claimed below. The handle comprises an elongate gripping portion stepping at a forward shoulder to a shield portion having a thicker dimension than the gripping portion. An inverted frustro-conical handle working portion is connected to a forward end of the shield portion and is configured oblong in cross-section having protruding opposite end surfaces and substantially less protruding lateral surfaces disposed between the end surfaces.

The working portion of the handle wedges within an oval-shaped through-bore of a tool head and establishes positive frictional engagement between the protruding surfaces and tool head bore sidewalls. The protruding surfaces align and face along the longitudinal plane of the wedge head and use of the tool serves to drive the protruding surfaces into the bore, whereby reinforcing the frictional connection between the handle and the tool head. Less protruding lateral sides of the handle working end are separated from the sides of the tool head bore by gaps and thereby avoid contact therewith.

The less protruding lateral sides of the handle working end are preferably flat and extend from the working end along the shield portion and thence along the handle gripping portions. The flat surfaces break the smooth curvature of the handle gripping portion circumference and provide longitudinal edges that enable the user to establish a positive grip upon the handle. The shield portion is disposed at a location along the handle to afford structural reinforcement where the handle is prone to contact a wheel rim in use.

The invention as summarized above is described in detail below and illustrated by the accompanying drawings.

BRIEF DESCRIPTION OF THE DRAWINGS

FIG. 3 is a right side elevational view of the subject handle.

FIG. 4 is a right side elevational view thereof, similar to that shown in FIG. 3, but with the handle rotated ninety degrees about its longitudinal center axis.

FIG. 5A is a transverse section view of the subject handle taken along the line 5A—5A of FIG. 4.

FIG. 5B is a transverse section view of the subject handle taken along the line 5B—5B of FIG. 4.

FIG. 5C is a transverse section view of the handle taken along the line 5C—5C of FIG. 4.

FIG. 5D is a transverse section view of the handle taken along the line 5D—5D of FIG. 4.

FIG. 5E is a transverse section view of the handle taken along the line 5E—5E of FIG.4.

FIG. 5F is a transverse section view of the handle taken along the line 5F—5F of FIG. 4.

FIG. 5G is a transverse section view of the handle taken along the line 5G—5G of FIG. 4.

DETAILED DESCRIPTION OF THE INVENTION

Figure 1:
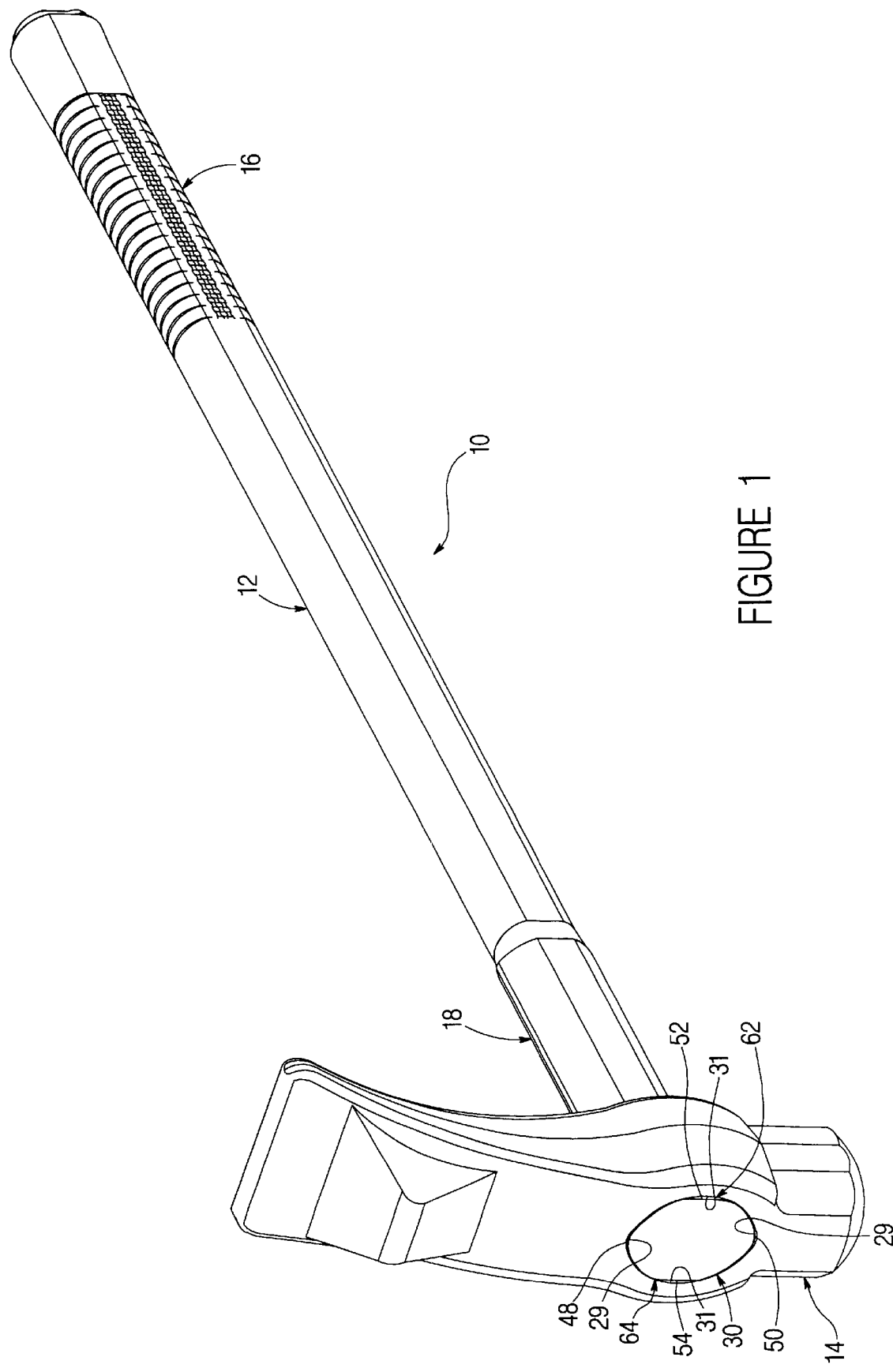
FIG. 1 is a right front perspective view of a tire bead-breaking wedge and handle configured pursuant to the subject invention.
Figure 2:
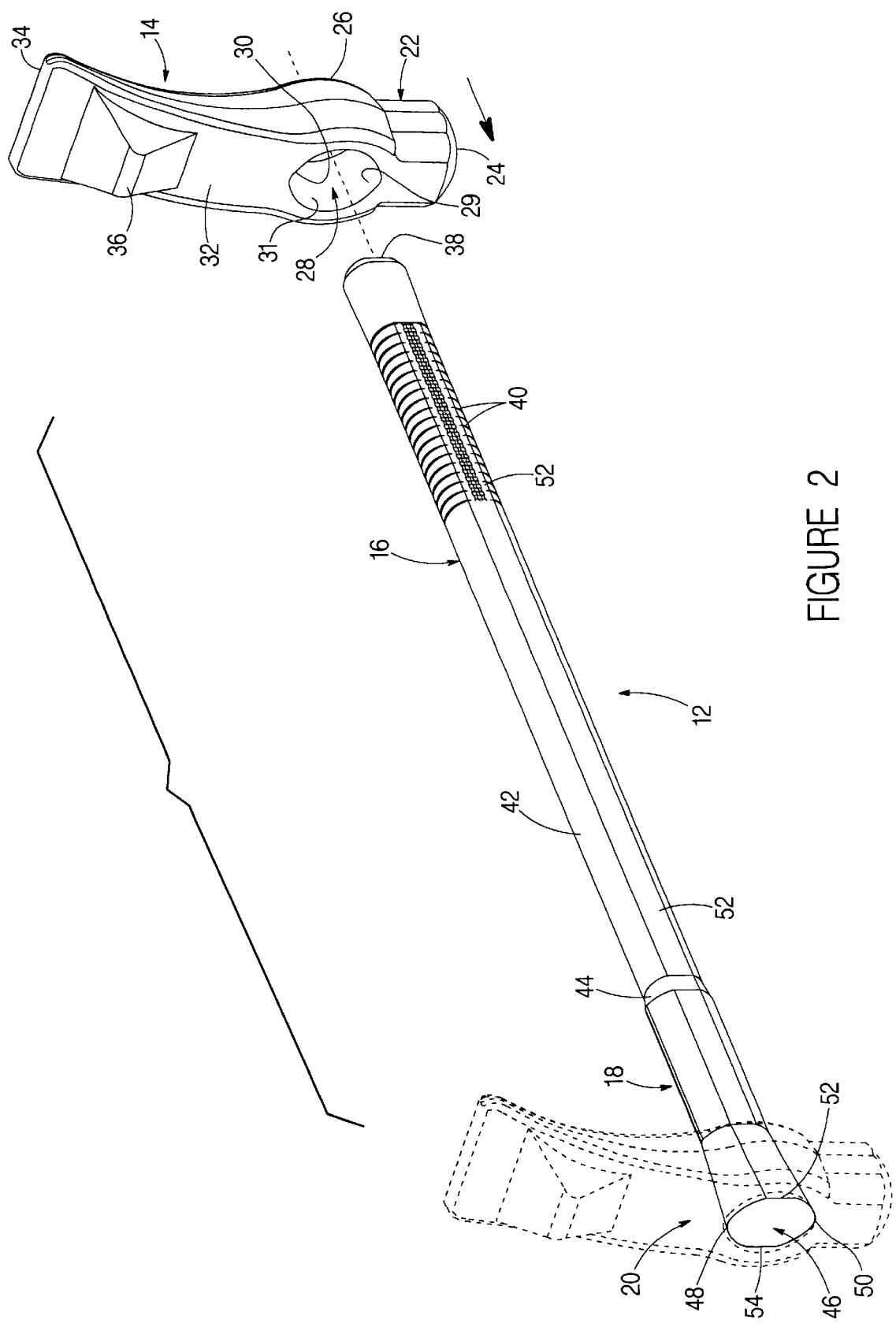
FIG. 2 is an exploded left front perspective view thereof.

Referring initially to FIGS. 1 and 2, a tire bead-breaking wedge 10 is shown to generally comprise an elongate handle 12 and a wedge head 14 transversely mounted to an end of the handle 12. While the subject handle 12 is shown in the preferred embodiment as a component of a tire bead-breaking wedge, its use is not and is not intended to be so restricted. Other implements or tools that incorporate an elongate handle affixed to a working head are applications for which the subject invention can provide utility.

The handle 12 is of preferably unitary construction, although a handle formed of attached component portions may be substituted if so desired without departing from the teachings of the present invention. The handle 12 includes a gripping portion 16 that steps outward into a shield portion 18. Shield portion 18, in turn, merges into a generally inverse frustro-conically shaped working portion 20. The head 14 of the tool 10 is elongate in a longitudinal direction and comprises an anvil end 22 that terminates at a hammer-striking surface 24. A connector socket 26 is disposed at the center of mass of the head 14, and comprises an oval in cross-section through-bore 28 defined by smooth sidewalls 30 comprising bore end walls 29 and lateral sidewalls 31. A lever arm 32 extends forward from the bore 28 to a terminal wedge edge 34. A pyramidal tire bead-depressing protrusion 36 projects outward from the lever arm 32 proximate to the wedge edge 34. The head 14 is preferably of unitary construction, formed of cast iron or other suitably hard material.

Referring more specifically to the handle 12, and with reference to FIGS. 2, 3, and 4, the gripping portion 16 extends from a rearward butt end 38 and includes a series of ridges 40 formed along an outer surface of the portion 16. Ridges 40 provide the user with a positive grip. The gripping portion 16 proceeds forward along a handle mid-portion 42 to an annular shoulder 44. Extending forward from the shoulder 44 is the handle shield portion 18 that merges with the forwardmost handle working portion 20. Working portion 20 terminates at a forward end surface 46.

The configuration of the subject handle in cross-section will be appreciated from a collective consideration of FIGS. 2 and 5A–5G. The handle working portion 20 is configured to have a generally oblong cross-section, comprising opposite protruding end surfaces 48, 50 and less protruding lateral surfaces 52, 54 disposed to extend along opposite sides of the working portion 20 between end surfaces 48, 50. While the lateral surfaces 52, 54 are preferably substantially flat, such surfaces may be formed into alternative shapes so long as end surfaces 52, 54 protrude outwardly substantially less than end surfaces 48, 50 for reasons explained below. By way of example, without any intention of constituting an exhaustive list of alternatives, surfaces 52, 54 may be formed to be slightly convex or concave if desired.

The working portion 20 of the handle 12 is composed preferable of rubber material 56 as shown in FIG. 5A. Other materials having a sufficiently high coefficient of friction and requisite resiliency, however, may be substituted if desired. At the merger of working portion 20 with the shield portion 18, the handle 12 assumes a composite construction shown in FIG. 5C. The handle at this point comprises an external sheath 57 composed of polypropelene material and an inner core 58 composed of fiber glass material. Other materials may be substituted if desired or the handle 12 may be formed formed from a single material if desired.

The composite composition of handle 12 continues to the rearward end 38 as will be appreciated from FIGS. 5D–5G. 1n addition, it will be noted from FIGS. 2 and 5A–5G that the opposite lateral surfaces 52, 54 beginning at the working portion 20 continue down the sides of the handle 12 to the rearward end 38. Flat surfaces 52, 54 thus serve to vary the smooth circumferential geometry of the handle gripping portion 16. Ridges 60 are created at the edges of the flat surfaces 52, 54 along the handle 12. The surfaces 52, 54 and ridges 60 create an uneven external handle circumference that allows the user of the handle to establish and maintain a positive grip upon the handle 12. The handle 12, as with the working portion 20, is oblong in cross-section and includes in the preferred embodiment the uneven circumferential geometry shown. While it is desirable to extend the lateral surfaces 52, 54 along the gripping portion 16 for the reasons explained above, the flat lateral surfaces 52, 54 may be confined to the working portion 20 if so desired and the remainder of the handle 12 may be formed having alternative sectional geometries if desired. By way of example, without representing an exhaustive list, the handle gripping portion 16 may be created having a circular or oval cross-section if desired.

The working end 20 the handle 12 assembles into the tool head 14 as will be understood from FIGS. 1 and 2. The handle is inserted gripping portion 16 first through the oval through-bore 28 of the head 14. The gripping portion 16 and the shield portion 18 are dimensioned to feed through the bore 28 with clearance. The protruding ends 48, 50 of the working end 20 are oriented along the longitudinal plane of the head member 14. That is, surface 48 faces the striking surface 24 of head 14 and the surface 50 faces the wedge edge 34. The working end 20 is press fitted into the through bore 28 of head 14 until a friction fit between surfaces 48, 50 and bore end walls 29 of bore sidewalls 30 prevents further inward movement of the handle. So wedged, the engagement between the surfaces 48, 50 and bore walls 29 secures the head 14 to the handle 12 and affords the user optimal mechanical advantage when the tool is utilized.

It will be appreciated that gaps 62, 64 are formed between the lateral surfaces 52, 54 of working portion 20 and lateral sidewalls 31 of the bore 28. The gaps 62, 64 are oriented transverse to the longitudinal plane of the head 14. The flat (less protruding) configuration of the lateral surfaces 52, 54, created by the oblong sectional configuration of the working portion 20, facilitates the formation of the gaps 62, 64.

In use, the wedge edge 34 of the head 14 is inserted between a tire bead and a wheel rim. The edge 34 is driven downward by application of a striking force to the striking surface 24. Thereafter, the head 14 is typically rocked laterally relative to the longitudinal axis or plane of the head 14. Such movement tends to work the head 14 further down the handle working portion 20 toward end 46, a movement that reinforces the press-fit frictional engagement between handle surfaces 48, 50 and sidewalls 30 of the bore 28. Thus, use of the wedge head 14 in the direction of its intended use serves to reinforce the connection between the handle and head. The head 14 will not, accordingly, require the user to separately reestablish its connection with the handle 12, as in prior art tire bead-breaking wedges.

It will be further appreciated that the wear caused by frictional engagement of working end 20 within bore 28 will occur along surfaces 48, 50. Because of the oblong configuration of the portion 20 in section, and the gaps 62, 64 between working portion surfaces 52, 54 and bore sidewalls 30 created thereby, surfaces 52, 54 will not be in contact with sidewalls 30. As end surfaces 48, 50 wear down from use of the tool, surfaces 48, 50 will remain the sole region of contact between working end 20 and the wedge head 14. The less protruding lateral surfaces 52, 54 will not evolve into regions of contact between the handle and head as eventually occurs in state of the art handle and tool head configurations. As discussed above, prior art tools wearing down at the working portion can until the lateral sides of the working portion become the sole or primary regions of contacting with the sidewalls of the tool head bore. When that occurs, the head is frictionally connected to the handle along such lateral sides of the bore. A subsequent working of the tool back and forth along its longitudinal plane will act to pivot the head about lateral surfaces 52, 54 of the handle working end. This pivotal "play", or rocking motion, results in a degradation in the mechanical advantage provided by the tool. Eventually, the head can further work its way loose from the handle. Since no reinforcement of the frictional fit between the tool head and the lateral sides of the handle working portion is effected by state of the art tools, the head may eventually separate from the handle.

As a consequence, the working portion 20 of the present invention provides distinctive advantages over the prior art. The invention not only provides a handle capable of establishing a positive frictional engagement within the bore of the tool head, but the handle further is configured to maintain a tight frictional connection through positive reinforcement of the connection through intended directional use of the tool head. Use of the tool, therefore, in its intended manner, self-tightens the frictional connection between the handle and the tool head.

Additionally, the handle provides the user with a comfortable gripping portion that is oblong in cross-section and includes longitudinal surfaces that break up the smooth external circumference of the handle. Resultingly, the user can establish and maintain a tight, comfortable grip upon the handle.

Another advantage achieved by the invention is a handle that provides structural reinforcement to portions prone to contact with a wheel rim during use. The shield portion 18 is dimensioned in section larger than the gripping portion 16. Located proximate to the working end 20, the shield portion 18 is positioned to engage the wheel rim as the tool is wedged beneath the tire bead. The shield portion 18, due to its increased thickness relative to the gripping portion 16, can withstand repeated contact with the wheel rim without breaking.

A further advantage of the invention is that the handle is economically and readily manufactured and readily connected to the tool head. The joint between the head and handle can be effected manually and, as explained previously, is self-tightening as the tool is worked.

While the above describes the preferred embodiment of the invention, the invention is not intended to be so limited. Other embodiments, which will be apparent to those skilled in the art and which practice the teachings herein set forth, are intended to be within the scope and spirit of the invention.

What is claimed is:

1. A handle including a tool head affixed to a working portion thereof, comprising:

a tool head having a bore defined by spaced apart bore sidewalls and spaced apart bore end walls;

an elongate shaft having a gripping portion and the working portion connected thereto;

the working portion is configured having an oblong cross-section comprising protruding opposite end surfaces separated a distance greater than the distance separating the tool head spaced apart end walls; and substantially less protruding opposite lateral surfaces disposed between the end surfaces and separated by a distance less than the distance separating the tool head member spaced apart bore sidewalls.

2. A handle as set forth in claim 1, wherein the working portion is substantially of inverted frustro-conical configuration.

3. A handle as set forth in claim 1, wherein the working portion tapers in cross-sectional dimension from a forward terminal end toward the gripping portion.

4. A handle as set forth in claim 1, wherein the handle shaft further comprises a shield portion disposed proximate to the working portion, the shield portion having a thickness greater than a thickness of the gripping portion.

5. A handle as set forth in claim 1, wherein at least one of the lateral surfaces in the working portion extends from the working portion along at least a portion of the gripping portion.

6. A handle including a tool head affixed to a working portion thereof, comprising:

a tool head including a bore extending therein defined by spaced apart bore sidewalls and spaced apart bore end walls;

an elongate shaft having a gripping portion and the working portion connected thereto and the working portion being substantially of inverted frustro-conical configuration and resident within the tool head bore and having an oblong cross-section, the handle working portion includes protruding opposite end surfaces spaced apart a distance sufficient to engage with interference respective bore end walls and substantially less protruding opposite lateral surfaces disposed between the end surfaces and spaced from a respective bore sidewall by a gap.

7. A handle as set forth in claim 6, wherein the handle shaft further comprises a shield portion disposed proximate to the working portion, the shield portion having a thickness greater than a thickness of the gripping portion.

8. A handle as set forth in claim 7, wherein at least one of the lateral surfaces in the working portion extends from the working portion along the shield portion and at least a portion of the gripping portion.

9. A handle as set forth in claim 6, wherein at least one of the lateral surfaces in the working portion extends from the working portion along at least a portion of the gripping portion.

10. A tire bead breaking tool, comprising:

a handle comprising an elongate shaft having a gripping portion and a working portion;

the working portion having an oblong cross-section comprising protruding opposite spaced apart end surfaces and substantially less protruding opposite spaced apart lateral surfaces disposed between the end surfaces; and a tool head member, the head member having a bore extending therein receiving the handle working portion, the bore being defined by bore sidewalls each spaced inward from a respective working portion lateral surface by a gap, and the bore being further defined by bore endwalls, each engaging with interference a respective working portion end surface.

11. A tire bead breaking tool according to claim 10, wherein the working portion of the handle shaft engages the bore sidewalls of the tool head member along the protruding end surfaces.

12. A tire bead breaking tool according to claim 11, wherein the working portion of the handle shaft is substantially of inverted frustro-conical configuration.

13. A tire bead breaking tool according to claim 11, wherein the tool head member extends along a longitudinal direction from the bore to at least one remote bead breaking portion, and the protruding end surfaces of the working portion of the handle shaft are oriented along the longitudinal direction of the tool head member.

14. A tire bead breaking tool according to claim 11, wherein the less protruding lateral surfaces of the working head member are substantially flat.

15. A tire bead breaking tool as set forth in claim 14, wherein the handle shaft further comprises a shield portion disposed proximate to the working portion, the shield portion having a thickness dimension greater than a thickness dimension of the shaft gripping portion.

16. A handle as set forth in claim 15, wherein at least one of the lateral surfaces in the working portion extends from the working portion along the shield portion and at least a portion of the gripping portion.

17. A tire bead breaking tool, comprising:

a handle comprising an elongate shaft having a gripping portion and a substantially inverted frustro-conical working portion;

the working portion having protruding opposite end surfaces extending in a longitudinal direction and relatively less protruding opposite lateral surfaces disposed between the end surfaces and extending in a transverse direction; and a tool head member, the tool head member having a substantially oval cross-sectional bore receiving the handle working portion therein and defined by bore sidewalls dimensioned in a longitudinal direction to engage the handle shaft working portion end surfaces and dimensioned in a transverse direction to maintain clearance between the working portion lateral surfaces and the bore sidewalls.

18. A tire bead breaking tool according to claim 17, wherein the tool head member extends along a longitudinal direction from the bore to at least one bead-breaking portion, and the protruding end surfaces of the working portion of the handle shaft are oriented along the longitudinal direction of the tool head member.

19. A tire bead breaking tool according to claim 18, wherein the less protruding lateral surfaces of the working portion of the shaft are substantially flat.

20. A tire bead breaking tool as set forth in claim 19, wherein the handle shaft further comprises a shield portion disposed proximate to the working portion, the shield portion having a thickness dimension greater than a thickness dimension of the shaft gripping portion.

21. A tire bead breaking tool according to claim 20, wherein the less protruding lateral surfaces of the working portion of the shaft extend along the shield portion and at least a portion of the shaft gripping portion.

* * * * *